(12) United States Patent
Kane

(10) Patent No.: US 8,225,478 B2
(45) Date of Patent: Jul. 24, 2012

(54) MEMORY SHAPE BUSHINGS AND BEARINGS

(75) Inventor: Daniel J. Kane, Mercer Island, WA (US)

(73) Assignee: The Boeing Company, Chicago, IL (US)

( * ) Notice: Subject to any disclaimer, the term of this patent is extended or adjusted under 35 U.S.C. 154(b) by 704 days.

(21) Appl. No.: 12/022,886

(22) Filed: Jan. 30, 2008

(65) Prior Publication Data

US 2009/0190868 A1    Jul. 30, 2009

(51) Int. Cl.
*B23P 11/02*    (2006.01)

(52) U.S. Cl. ............ 29/447; 29/525; 148/669; 148/675; 411/909

(58) Field of Classification Search ............... 29/888.09, 29/447, 525, 557, 888.091, 888.092, 524.1; 74/579 R; 148/669, 675; 384/492, 513, 384/569; 411/501, 34, 504, 903, 909
See application file for complete search history.

(56) References Cited

U.S. PATENT DOCUMENTS

| | | |
|---|---|---|
| 3,945,695 A | 3/1976 | Speakman |
| 3,971,566 A | 7/1976 | Levinsohn |
| 4,324,441 A * | 4/1982 | Rouverol et al. ............. 384/492 |
| 4,619,580 A | 10/1986 | Snyder |
| 4,743,079 A | 5/1988 | Bloch |
| 4,761,955 A | 8/1988 | Bloch |
| 4,798,051 A | 1/1989 | Foote |
| 4,825,184 A | 4/1989 | Bloch |
| 4,900,078 A | 2/1990 | Bloch |
| 4,932,210 A | 6/1990 | Julien |
| 5,005,678 A | 4/1991 | Julien |
| 5,013,507 A | 5/1991 | Julien |
| 5,046,426 A | 9/1991 | Julien |
| 5,120,175 A * | 6/1992 | Arbegast et al. .............. 411/501 |
| 5,276,455 A | 1/1994 | Fitzsimmons |
| 5,488,380 A | 1/1996 | Harvey |
| 5,944,285 A | 8/1999 | Royer |
| 6,065,934 A | 5/2000 | Jacot |
| 6,209,824 B1 | 4/2001 | Caton |
| 6,260,567 B1 | 7/2001 | Gruensfelder |
| 6,322,324 B1 | 11/2001 | Kennedy |
| 6,349,903 B2 | 2/2002 | Caton |
| 6,394,397 B1 | 5/2002 | Ngo |
| 6,453,669 B2 | 9/2002 | Kennedy |
| 6,499,952 B1 | 12/2002 | Jacot |
| 6,588,709 B1 | 7/2003 | Dunne |
| 6,699,015 B2 | 3/2004 | Villhard |
| 6,702,873 B2 | 3/2004 | Hartman |
| 6,712,542 B2 | 3/2004 | Buder |
| 6,718,752 B2 | 4/2004 | Nesbitt |
| 6,796,408 B2 | 9/2004 | Sherwin |
| 6,886,622 B2 | 5/2005 | Villhard |
| 6,989,197 B2 | 1/2006 | Schneider |
| 7,037,076 B2 | 5/2006 | Jacot |
| 7,096,740 B2 | 8/2006 | Wilkerson |
| 7,159,398 B1 | 1/2007 | Bushnell |
| 7,628,874 B2 * | 12/2009 | Wojcik .......................... 148/675 |

* cited by examiner

*Primary Examiner* — Richard Chang
(74) *Attorney, Agent, or Firm* — Klintworth & Rozenblat IP LLC

(57) ABSTRACT

The disclosure provides bearing sleeves or bushings made of memory shape material, and processes for installing such bearing sleeves or bushings. In one process, inner and outer surfaces of a bearing sleeve, made of a memory shape material, may be compressed at least one first temperature. A bearing may be inserted in a cavity of the bearing sleeve, and the bearing sleeve may be disposed adjacent to a surface of a structure, while the bearing sleeve is at the at least one first temperature. The inner and outer surfaces of the bearing sleeve may be expanded, at least one second temperature, to abut against the bearing and the surface of the structure.

25 Claims, 10 Drawing Sheets

MEMORY SHAPE BUSHINGS AND BEARINGS

BACKGROUND

Many of the existing bearings and/or bushings, and/or methods of installation, utilize press-fits, fasteners, and/or other mechanisms such as attempted shrinking of the parts to install the bearings and/or bushings to a structure. However, use of these bearings and/or bushings may have fit tolerance issues, increased weight, size, and labor due to fasteners, damage and/or increased stress or fatigue to the bearings, bushings, and/or structures, and/or one or more other types of problems.

An apparatus and/or method is needed to decrease one or more problems associated with one or more of the existing apparatus and/or methods.

SUMMARY

In one aspect of the disclosure, an apparatus comprises at least a portion of one of a bearing and a bushing comprising a memory shaped material for expanding against a surface of a structure.

In another aspect of the disclosure, a method is disclosed for installing at least one of a bearing and a bushing. In one step, at least a portion of one of a bearing and a bushing is provided comprising a memory shaped material. In another step, a temperature of the memory shaped material is lowered below a first temperature to compress the memory shaped material into a martensitic shape. In an additional step, the memory shaped material is installed against a surface of a structure while the memory shaped material is in the martensitic shape. In yet another step, the temperature of the memory shaped material is raised above a second temperature to expand the memory shaped material into an austenitic shape against the surface of the structure.

These and other features, aspects and advantages of the disclosure will become better understood with reference to the following drawings, description and claims.

DETAILED DESCRIPTION

The following detailed description is of the best currently contemplated modes of carrying out the disclosure. The description is not to be taken in a limiting sense, but is made merely for the purpose of illustrating the general principles of the disclosure, since the scope of the disclosure is best defined by the appended claims.

Figure 1:
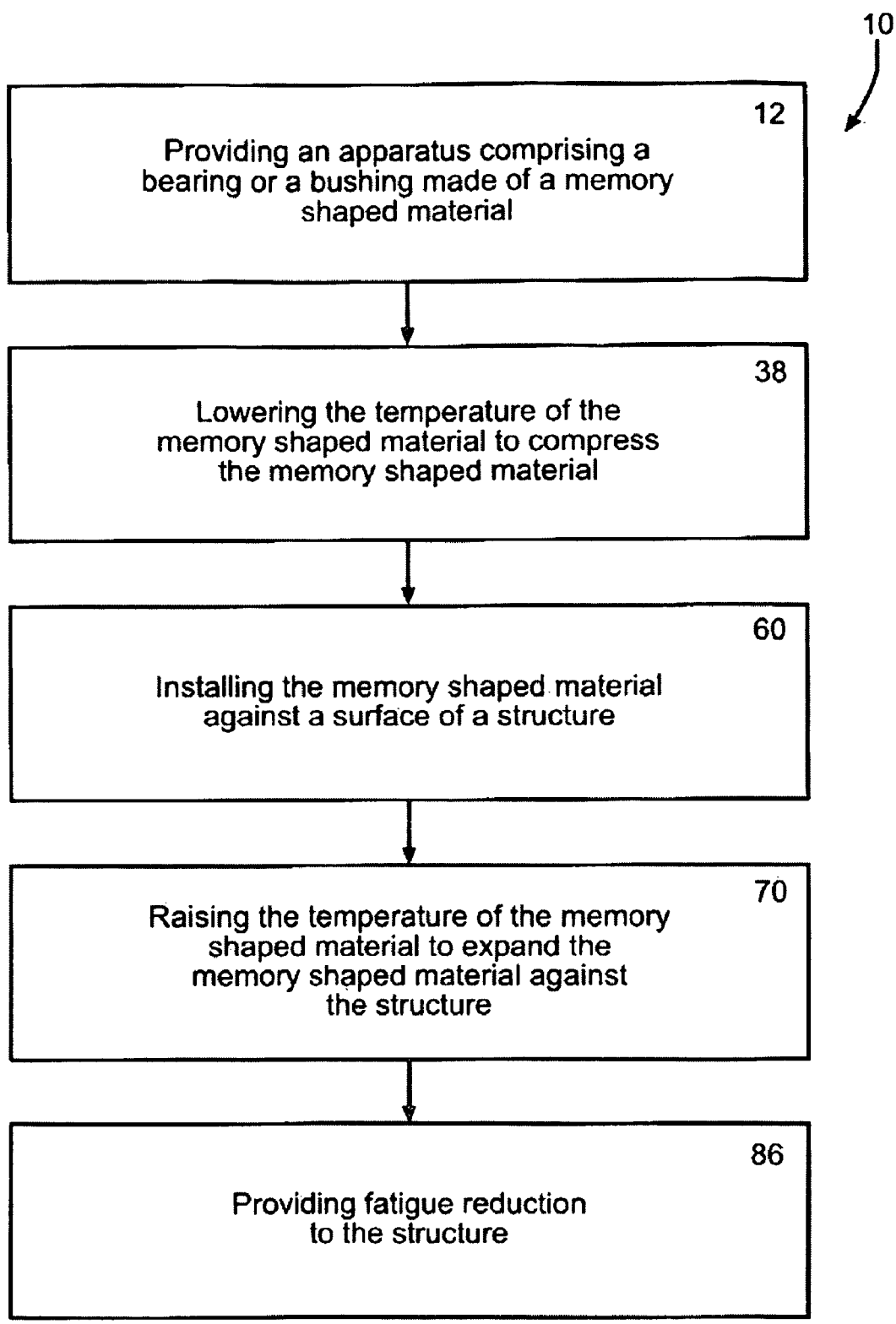
FIG. 1 shows a flowchart of a method for installing an apparatus comprising at least one of a bearing and a bushing.
Figure 2:
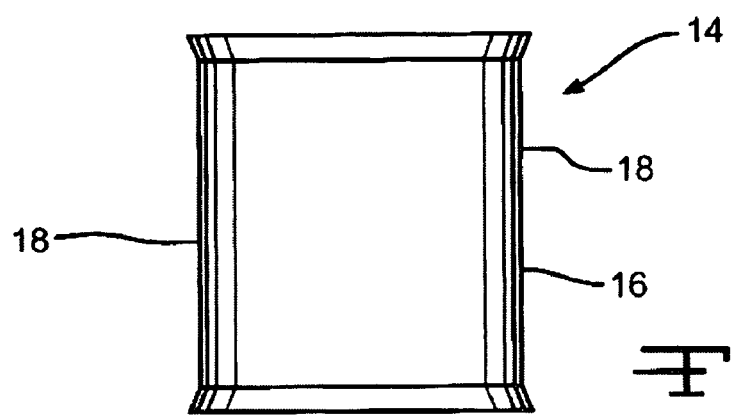
FIG. 2 shows a side view of one embodiment of a bearing sleeve.
Figure 3:
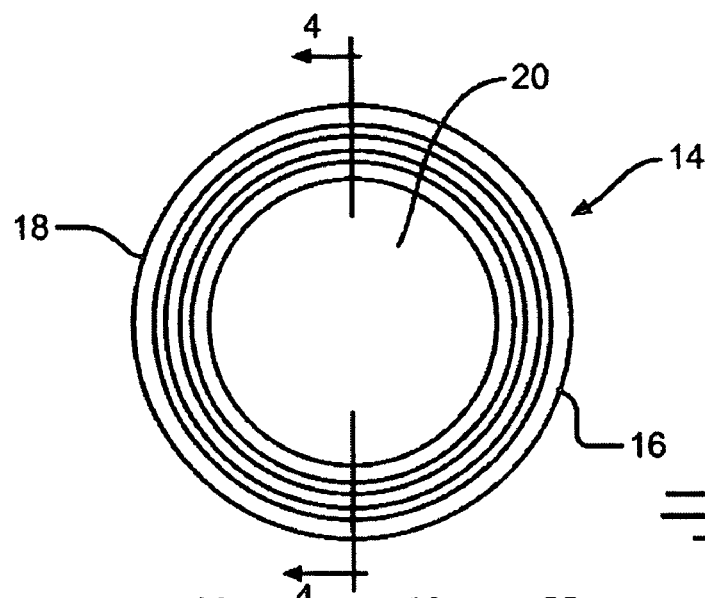
FIG. 3 shows a top view of the bearing sleeve of FIG. 2.
Figure 4:
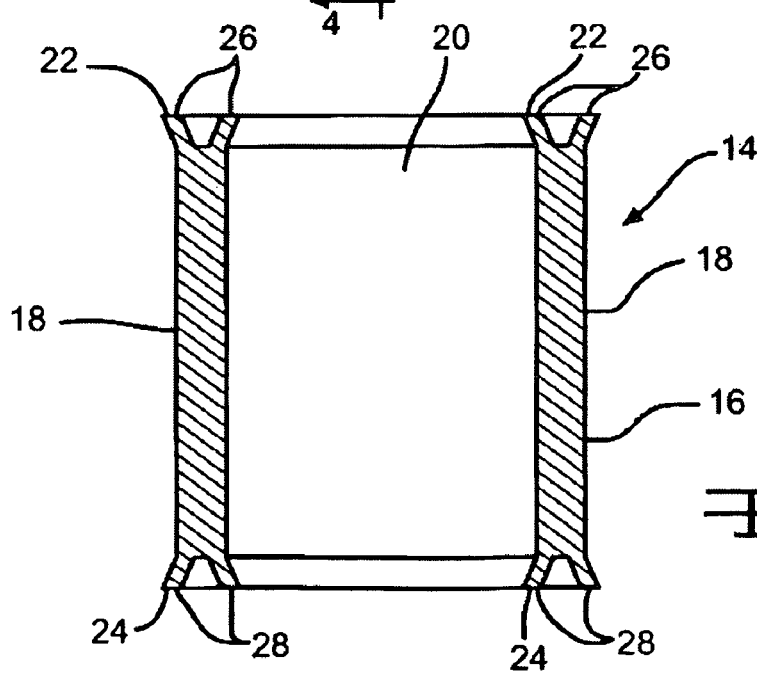
FIG. 4 shows a cross-section view through line 4-4 of the bearing sleeve of FIG. 3.
Figure 5:
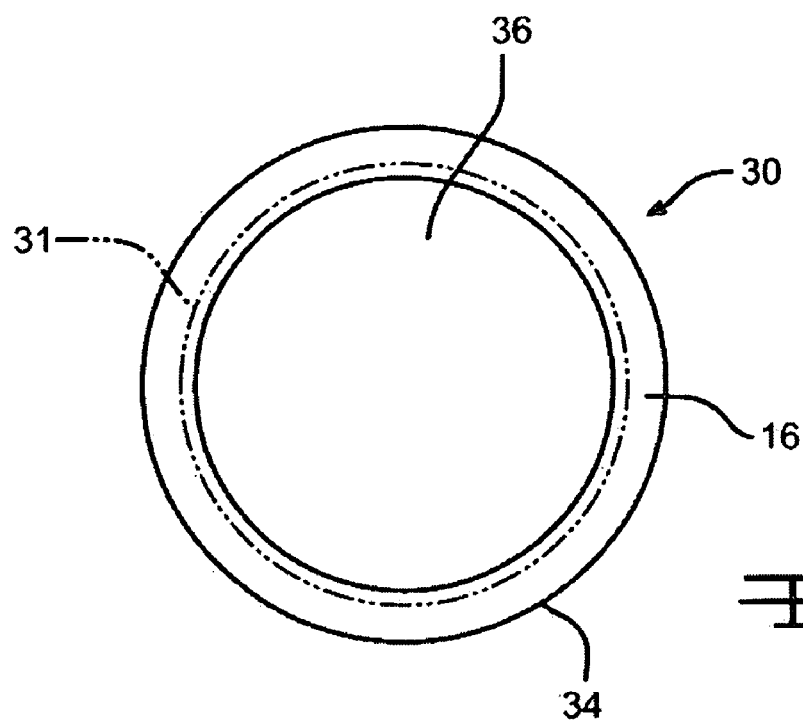
FIG. 5 shows a top view of one embodiment of a bushing.
Figure 6:
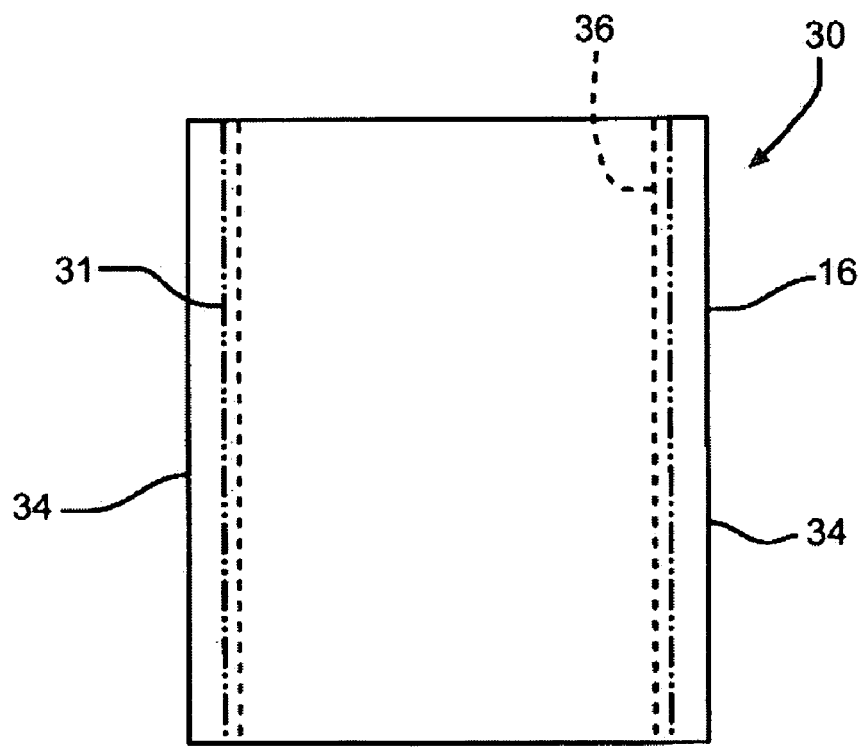
FIG. 6 shows a side view of the bushing of the embodiment of FIG. 5.

FIG. 1 shows a flowchart of a method 10 for installing an apparatus comprising at least one of a bearing and a bushing. In step 12, an apparatus comprising at least a portion of one of a bearing and a bushing are provided comprising a memory shaped material. FIGS. 2-4 respectively show a side view, a top view, and a cross-section view through line 4-4 of FIG. 3, for one embodiment of a bearing sleeve 14 which may be provided in step 12. The bearing sleeve 14 may be made of a memory shaped material 16, and may comprise a cylindrical outer surface 18 which is defined by an inner hole 20. The memory shaped material 16 may comprise at least one of Nitinol, a Nickel-Titanium based alloy, a Copper-based material, Beryllium, and/or another type of memory shaped material. Opposite ends 22 and 24 of the outer surface 18 may comprise outwardly extending flanges 26 and 28. FIGS. 5-6 respectively show a top view and a side view for one embodiment of a bushing 30 which may be provided in step 12. The bushing 30 may be made of the memory shaped material 16 and comprise an outer cylindrical surface 34 which may be defined by an inner hole 36. The bushing 30 may also have optional threads 31.

Figure 7:
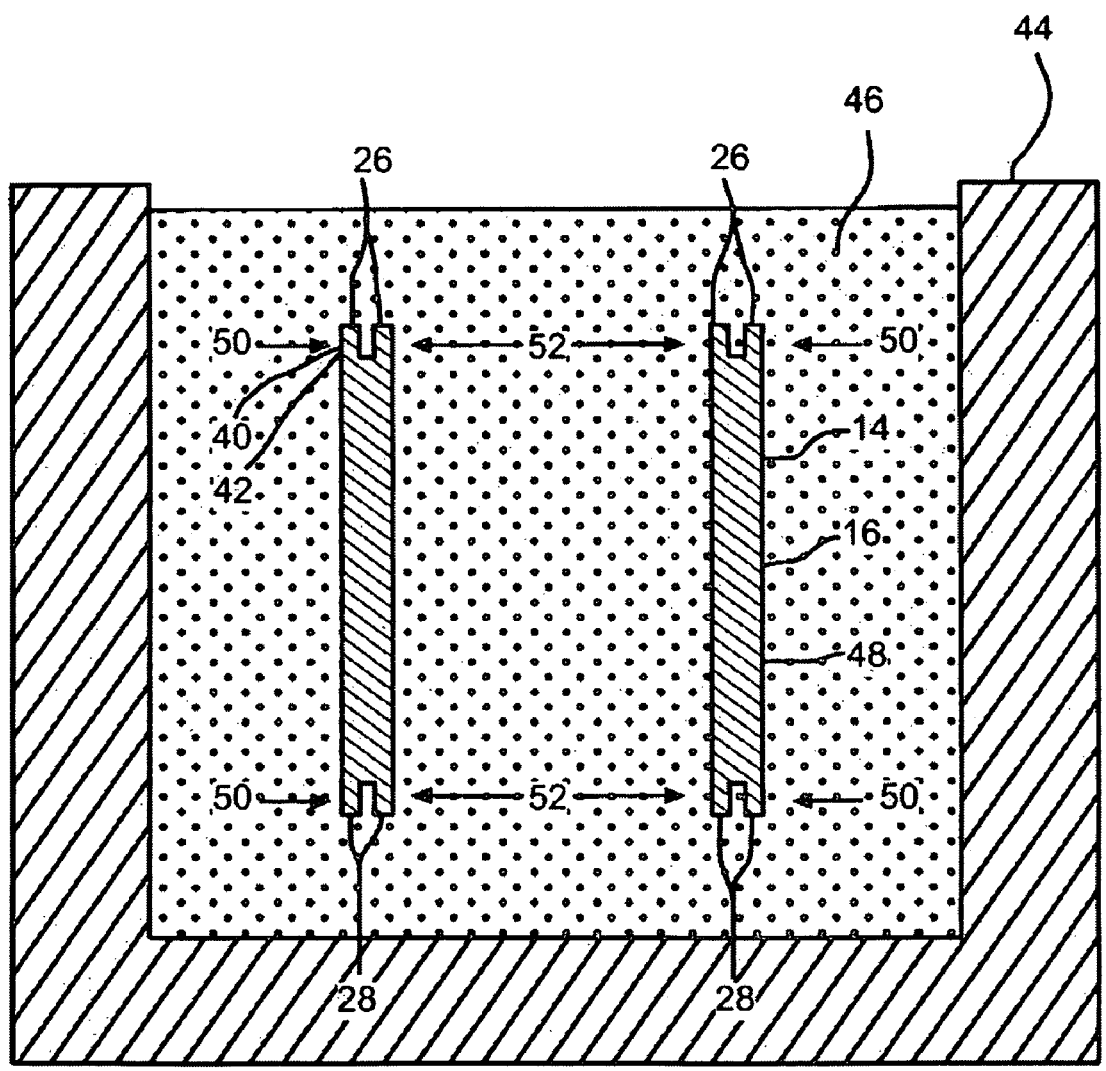
FIG. 7 shows a cross-sectional view through line 4-4 of the bearing sleeve of FIG. 3 after it is inserted within a bucket of cooling material to compress the bearing sleeve.

In step 38 of the method 10 of FIG. 1, the temperature of the memory shaped material may be lowered below a first temperature to compress the memory shaped material into a martensitic shape. FIG. 7 shows a cross-sectional view through line 4-4 of the bearing sleeve 14 of FIG. 3 after it is inserted within a bucket 44 of cooling material 46 to compress the bearing sleeve 14. The flanges 26 and 28 or the bearing sleeve 14 may compress inwardly along directions 50 and 52 from their outward extended shape of FIGS. 2-4 to their linear/parallel shape of FIG. 7, under one embodiment of step 38. This compression may be due to the cooling material 46 lowering the temperature 40 of the bearing sleeve below a first temperature 42. The first temperature 42 may comprise the martensitic finish temperature of the memory shaped material 16. In other embodiments, the first temperature 42 may vary. The cooling material 46 may comprise an immersion liquid, liquid nitrogen, a cooling solid, a cooling surface, a cooling gas flow, and/or other types of cooling materials. In such manner, the memory shaped material 16 may be compressed into a pre-determined, compressed, martensitic shape/state 48. In other embodiments, the bearing sleeve 14 may be compressed into varying configurations in its martensitic shape/state 48.

Figure 7A:
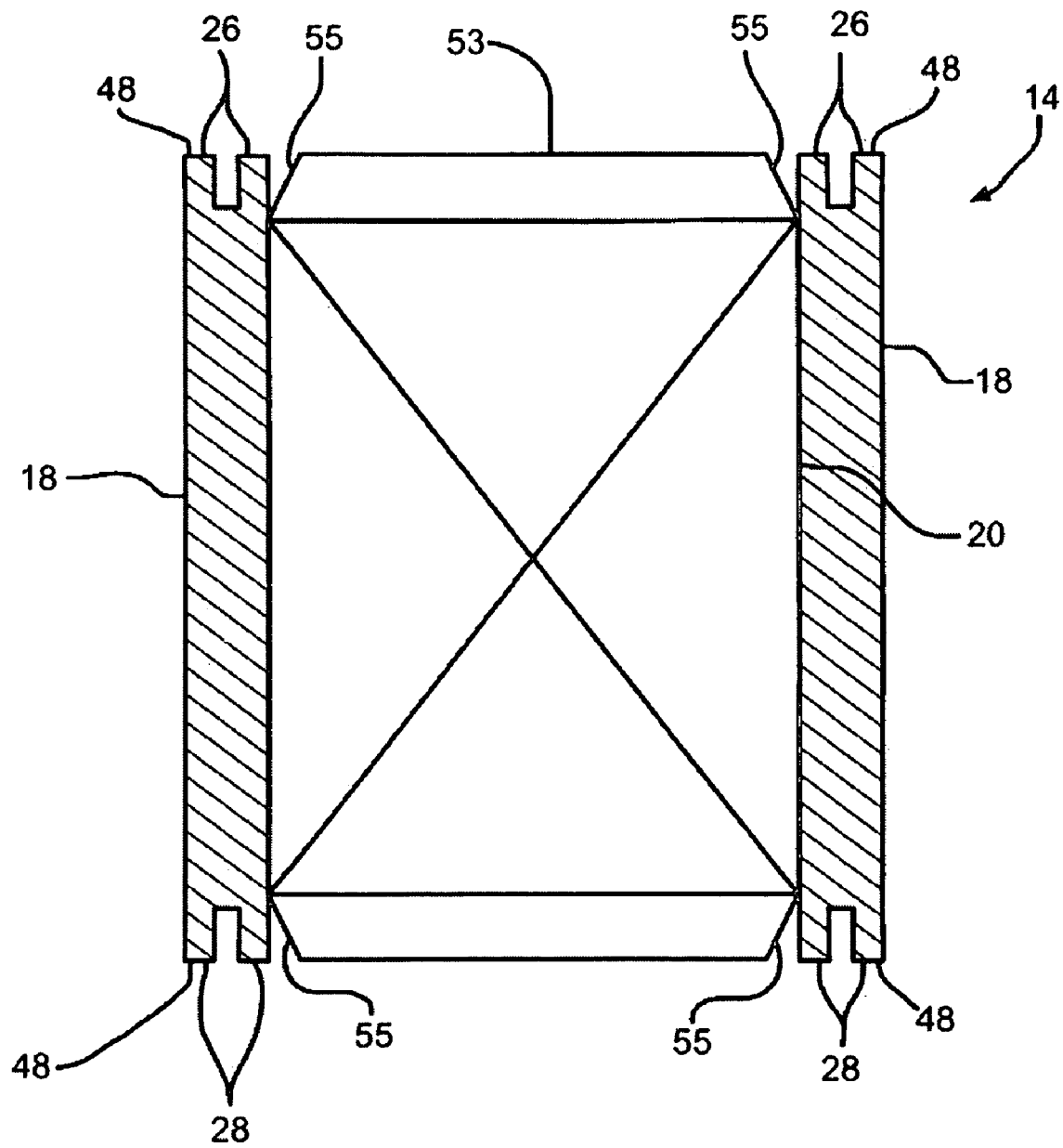
FIG. 7A shows the cross-sectional view of the bearing sleeve of FIG. 7 after the bearing sleeve has been removed from the bucket and a bearing has been inserted within the cooled down and compressed bearing sleeve.

FIG. 7A shows the cross-sectional view of the bearing sleeve 14 of FIG. 7 after it has been removed from the bucket 44, and a bearing 53 having angled surfaces 55, has been slid within the inner hole 20 of the cylindrical outer surface 18 while the flanges 26 and 28 of the bearing sleeve 14 are in their compressed martensitic shape/state 48. In such manner, the bearing 53 may be installed/disposed inside the bearing sleeve 14 without the bearing 53 being damaged by the flanges 26 and 28 during the installation process. The bearing 53 may comprise any type of bearing such as a ball bearing, or any other type of bearing known in the art.

Figure 8:
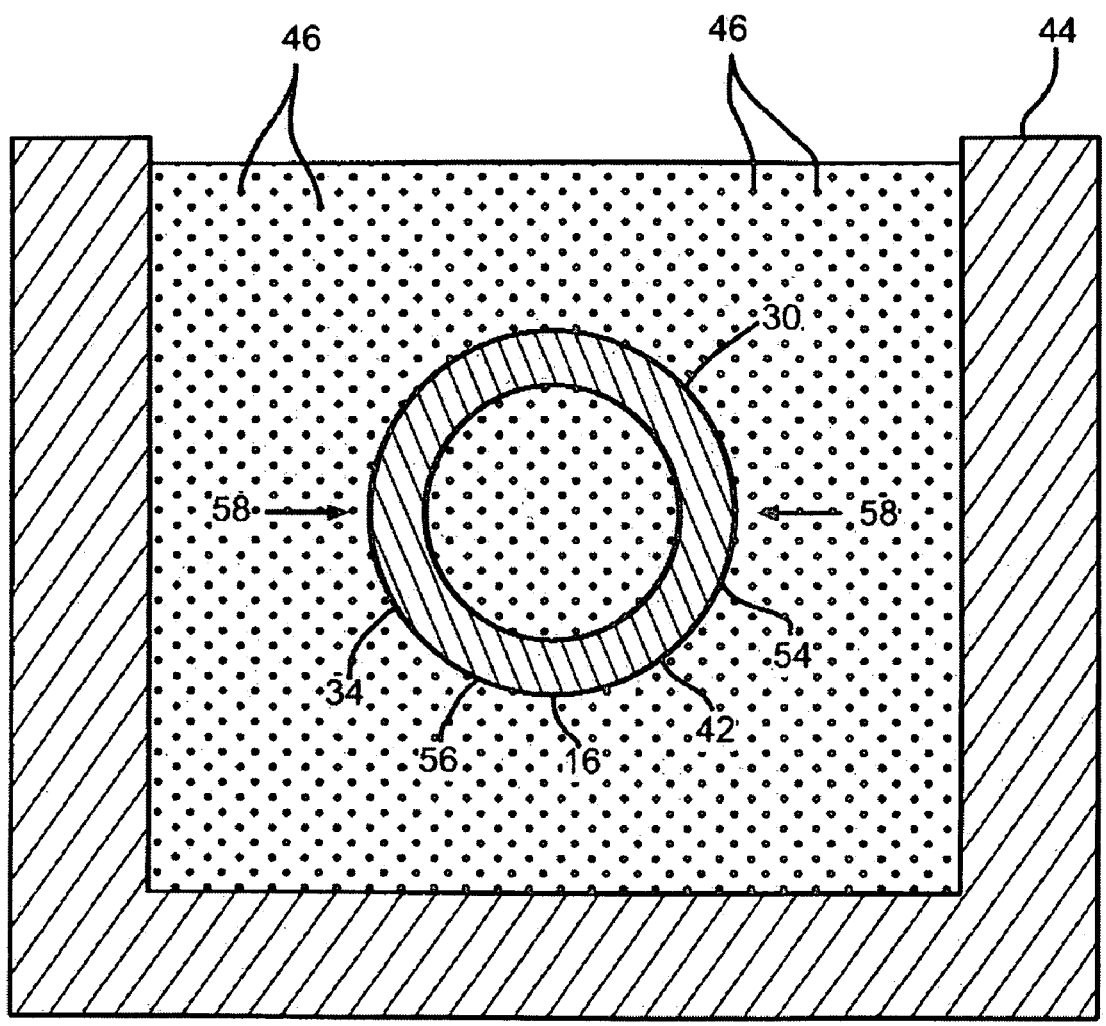
FIG. 8 shows the top view of the bushing of FIG. 5 after it is inserted within a bucket of cooling material to compress the bushing.

FIG. 8 shows the top view of the bushing 30 of FIG. 5 from within the bucket 44 of cooling material 46 of FIG. 7, under another embodiment of step 38, in which the bushing 30 of FIGS. 5-6 has been inserted into the bucket 44 of cooling material 46 to lower the temperature 54 of the bushing 30 below the first temperature 42. In such manner, the memory shaped material 16 may be compressed into a pre-determined martensitic shape/state 56. In the martensitic shape/state 56 the outer cylindrical surface 34 may be compressed inwardly in direction 58 from its shape of FIGS. 5-6 to its shape of FIG. 8. In other embodiments, the bushing 30 may be compressed into varying configurations in its martensitic shape/state 56.

Figure 9:
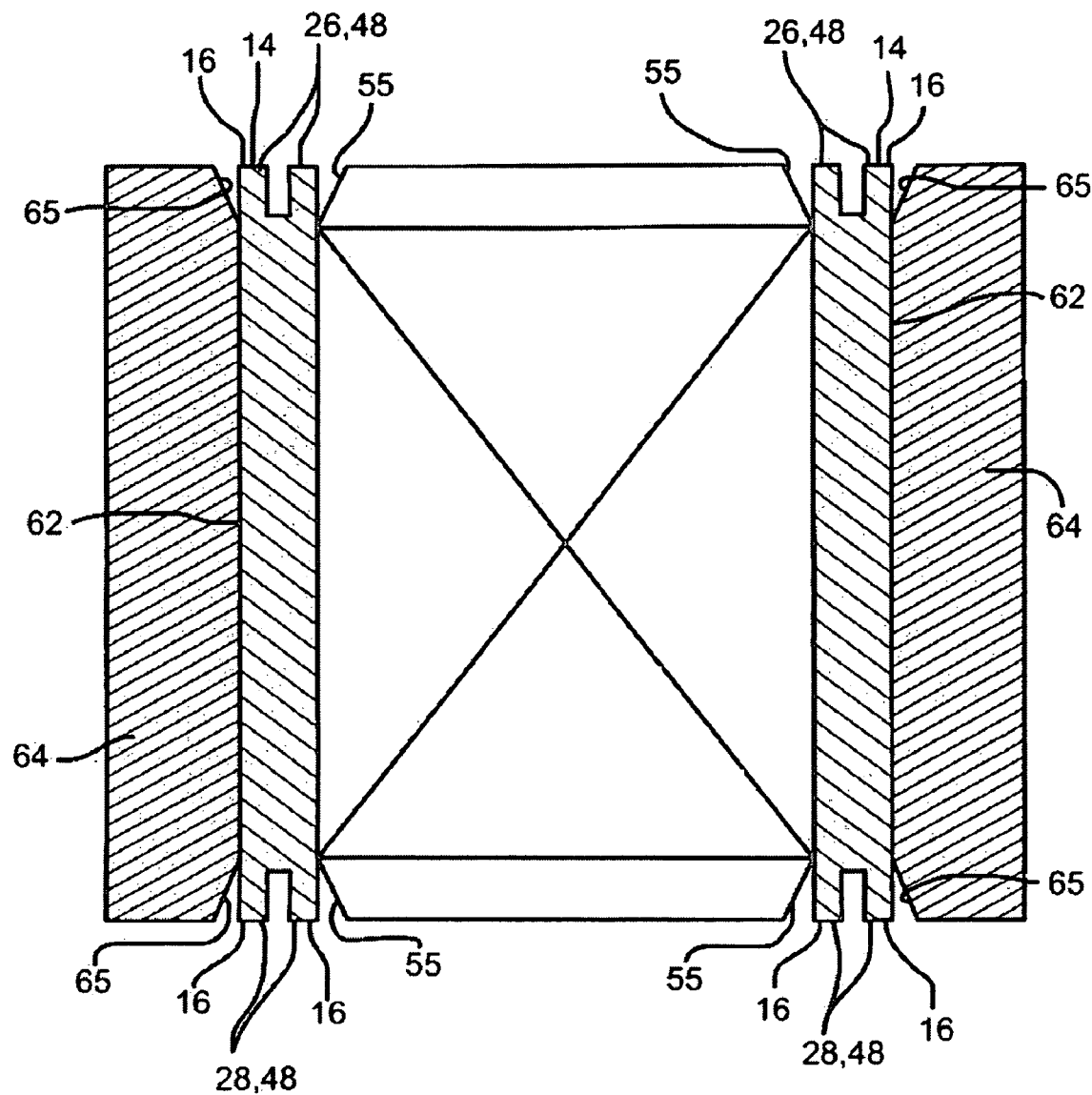
FIG. 9 shows the cross-sectional view of the bearing sleeve and bearing of FIG. 7A, with the cooled memory shaped material of the bearing sleeve having been installed against a cavity surface of a structure while the memory shaped material, including the flanges, is in its compressed martensitic shape.

In step 60 of the method 10 of FIG. 1, the memory shaped material may be installed against a surface of a structure while the memory shaped material is in the martensitic shape. FIG. 9 shows the cross-sectional view of the bearing sleeve 14 and bearing 53 having angled surfaces 55 of FIG. 7A, under one embodiment of step 60, with the cooled memory shaped material 16 of the bearing sleeve 14 having been installed against a cavity surface 62 of a structure 64 while the memory shaped material 16, including the flanges 26 and 28, is in its compressed martensitic shape 48. The structure 64 may comprise an aircraft, a vehicle, a structure, may be made of a metal, may be made of a composite, and/or may comprise varying devices, structures, materials, and types. Although inner surfaces 65 of the structure 64 may be angled, the compressed flanges 26 and 28 of the bearing sleeve 14 may slide against the cavity surface 62 of the structure 64 without damage to the bearing sleeve 14 due to the compression of the flanges 26 and 28.

Figure 10:
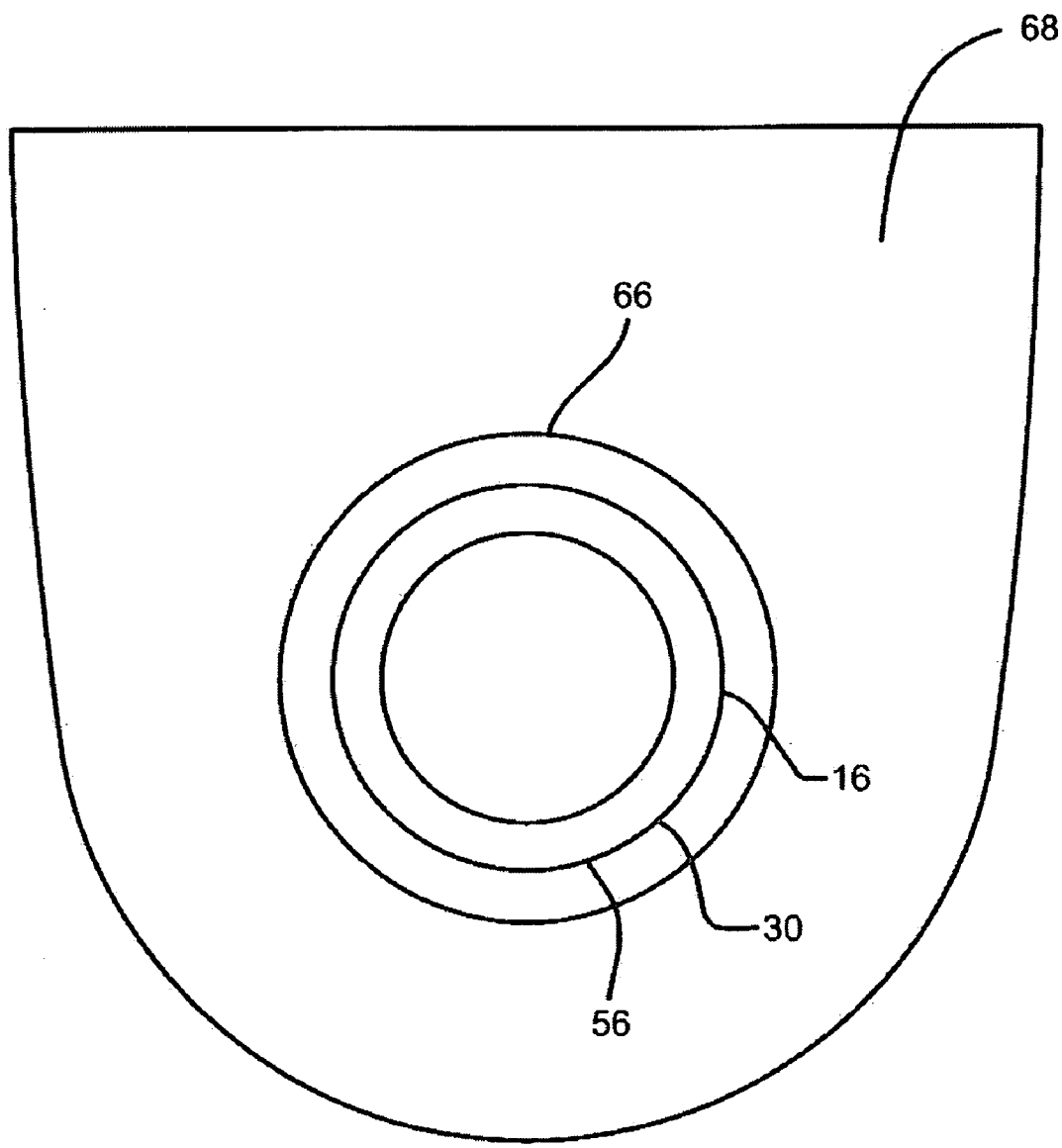
FIG. 10 shows the top view of the bushing of FIG. 8 having been removed from the bucket and installed against a cavity surface of a structure while in its compressed martensitic state.

FIG. 10 shows the top view, under another embodiment of step 60, of the cooled memory shaped material 16 of the bushing 30 of FIG. 8 having been removed from the bucket 44 and installed against/within a cavity surface 66 of a structure 68 while the memory shaped material 16 is in its compressed martensitic shape 56. The structure 68 may comprise an aircraft a vehicle, a structure, may be made of a metal, may be made of a composite, and/or may comprise varying devices, structures, materials, and types. The compressed martensitic shape 56 of the bushing 30 may allow the bushing 30 to fit within the cavity surface 66 of the structure 68 without damage to the bushing 30. The installing step 60 may further comprise installing the memory shaped material 16 of the bearing sleeve 14 or the bushing 30 as a new or replacement part of the structure 64.

Figure 11:
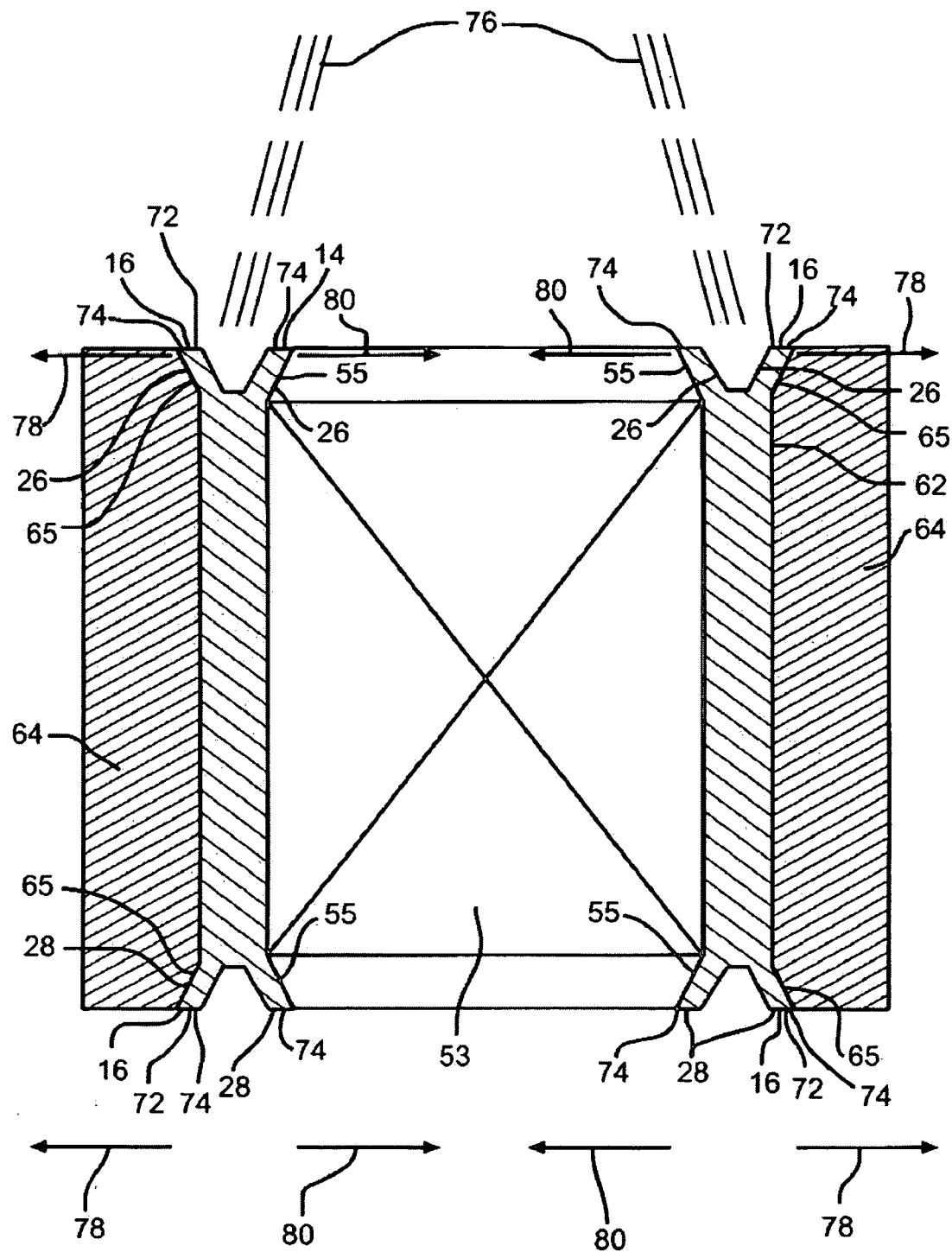
FIG. 11 shows the cross-sectional view of the bearing sleeve of FIG. 9 after the bearing sleeve has been heated up to expand the memory shaped material against the hearing and the cavity surface of the structure.

In step 70 of the method 10 of FIG. 1, the temperature of the memory shaped material may be raised above a second temperature to expand the memory shaped material into an austenitic shape against the surface of the structure. FIG. 11 shows the cross-sectional view of the bearing sleeve 14 and bearing 53 of FIG. 9, under one embodiment of step 70, after the memory shaped material 16 of the bearing sleeve 14 has been raised above a second temperature 72 to expand the memory shaped material 16, including the flanges 26 and 28, into its pre-determined austenitic shape 74 against the angled inner surfaces 65 of the cavity surface 62 of the structure 64, and also against the angled surfaces 55 of the bearing 53. The second temperature 72 may comprise the austenitic finish temperature of the memory shaped material 16. In other embodiments, the second temperature 72 may vary. A warming material 76 may have been used to raise the memory shaped material 16 above the second temperature 72. The warming material 76 may comprise a warming gas, a warming solid, a warming surface, and/or other types of warming materials.

As shown, after expanding, the memory shaped material 16 of the flanges 26 and 28 of the bearing sleeve 14 may have expanded along directions 78 and 80 back to their outwardly extending shape of FIG. 4. In such manner, the outwardly expanded flanges 26 and 28 of the bearing sleeve 14 may hold the angled surfaces 55 of the bearing 53 in place within the bearing sleeve 14 and prevent the bearing 53 from popping out without the use of a fastener. Similarly, the outwardly expanded flanges 26 and 28 of the bearing sleeve 14 may hold the bearing sleeve 14 in place against the angled inner surfaces 65 of the cavity surface 62 of the structure 64 and prevent the bearing sleeve 14 from popping out, again without the use of a fastener. In other embodiments, the bearing sleeve 14 may be expanded into varying configurations in its austenitic shape/state 74.

Figure 12:
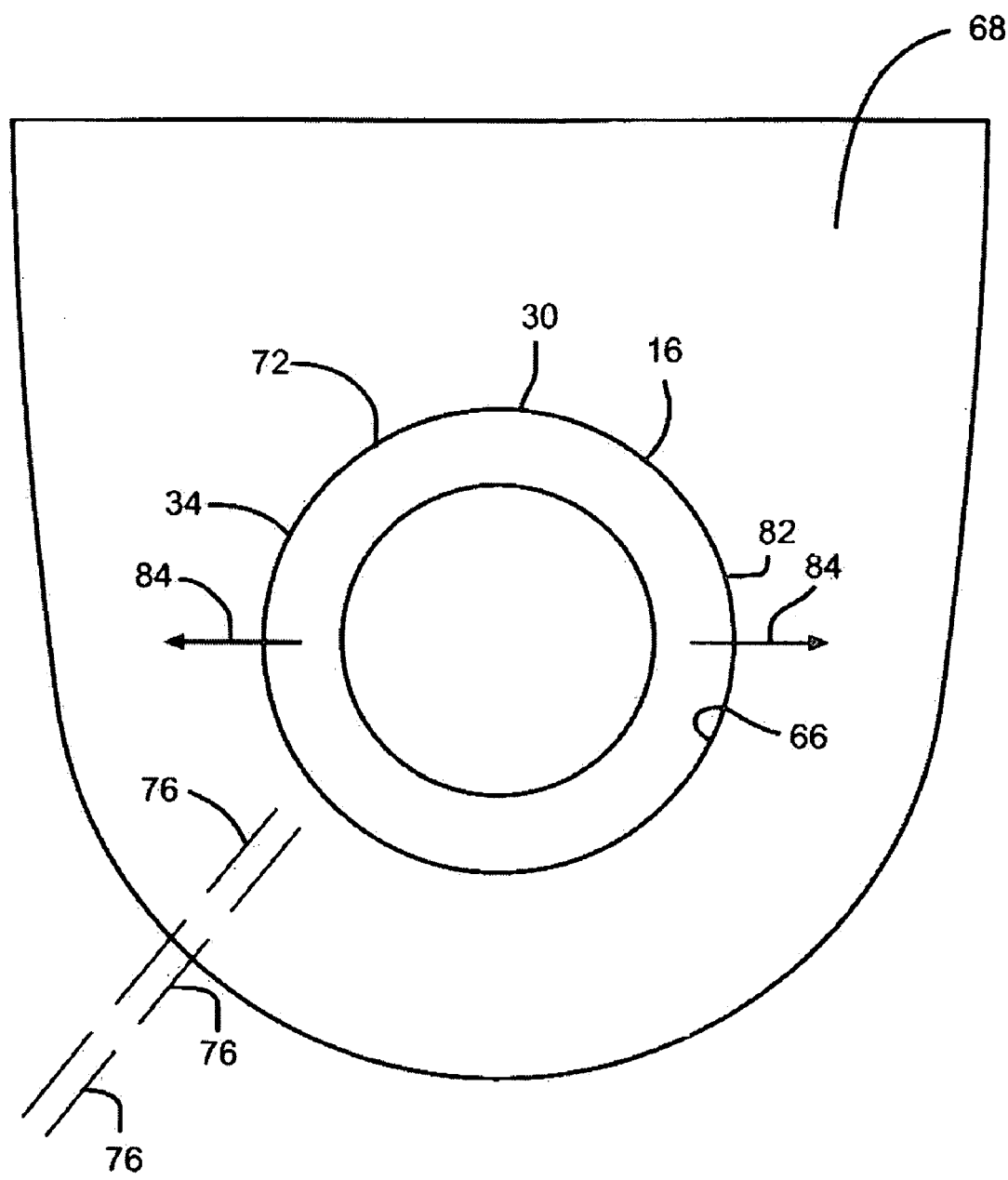
FIG. 12 shows the top view of the installed bushing of FIG. 10 having been heated up and expanded against the cavity surface of the structure.

FIG. 12 shows the top view, under one embodiment of step 70, of the installed memory shaped material 16 of the bushing 30 of FIG. 10 having been raised above the second temperature 72 to expand the memory shaped material 16 into a pre-determined austenitic shape 82 against the cavity surface 66 of the structure 68. The warming material 76 may have again been used to raise the memory shaped material 16 above the second temperature 72. As shown, after expanding, the outer cylindrical surface 34 may have expanded outwardly in direction 84 back to its shape of FIG. 5. In such manner, the expanded outer cylindrical surface 34 may hold the bushing 30 in place and prevent it from popping out of the cavity surface 66 of the structure 68 without the use of a fastener. In other embodiments, the bushing 30 may be expanded into varying configurations in its austenitic shape/state 82.

In step 86 of the method 10 of FIG. 1, the installed bearing 14 and/or 53 or bushing 30 may provide fatigue reduction to the structure 64 or 68. In such manner, stresses, strain, and/or fatigue may be reduced within the structure 64 or 68.

In another embodiment of the disclosure, an apparatus may be provided comprising at least a portion of one of a bearing 14 and/or 53 and a bushing 30 comprising a memory shaped material 16 for expanding against a surface 62 or 66 of a structure 64 or 68. The provided apparatus may comprise any of the structure and/or property embodiments disclosed herein.

One or more embodiments of the method and/or apparatus disclosed herein may reduce one or more problems of one or more of the existing methods and/or apparatus. For instance, one or more embodiments of the method and/or apparatus may allow for smaller designs without the necessity of additional fasteners, more lightweight designs without the additional weight of fasteners, less expensive designs without the cost of additional fasteners, greater use of composite structures, the reduction and/or elimination of bushing and/or bearing push-out, easier maintenance, and/or may reduce one or more other types of problems of one or more of the existing methods and/or apparatus.

It should be understood, of course, that the foregoing relates to exemplary embodiments of the disclosure and that modifications may be made without departing from the spirit and scope of the disclosure as set forth in the following claims.

The invention claimed is:

1. A method for installing a bearing comprising:
   providing a bearing sleeve comprising a memory shape material;
   compressing the memory shape material into a first shape in which an inner surface of the bearing sleeve compresses from an inner surface expanded state to an inner surface compressed state, and an outer surface of the bearing sleeve compresses from an outer surface expanded state to an outer surface compressed state;
   disposing a bearing into a cavity of the bearing sleeve adjacent to the inner surface while the inner surface is in the inner surface compressed state;
   disposing the outer surface of the bearing sleeve adjacent to a surface of a structure while the outer surface of the bearing sleeve is in the outer surface compressed state; and
   expanding the memory shape material into a second shape in which the inner surface of the bearing sleeve expands from the inner surface compressed state to the inner surface expanded state against the bearing disposed in the cavity of the bearing sleeve thereby locking the bearing within the cavity of the bearing sleeve with the bearing configured to rotate relative to the bearing sleeve, and the outer surface of the bearing sleeve expands from the outer surface compressed state to the outer surface expanded state against the surface of the structure thereby locking the bearing sleeve against the surface of the structure.

2. The method of claim 1 wherein the memory shape material comprises at least one of Nitinol, a Nickel-Titanium based alloy, a Copper-based material, or Beryllium.

3. The method of claim 1 wherein the compressing step comprises compressing, at a martensitic finish temperature of the memory shape material, the memory shape material into the first shape.

4. The method of claim 1 wherein the expanding step comprises expanding, at an austenitic finish temperature of the memory shape material, the memory shape material into the second shape.

5. The method of claim 1 wherein the compressing comprises using at least one of an immersion liquid, liquid nitrogen, a cooling material, a cooling solid, a cooling surface, or a cooling gas flow to reach a martensitic finish temperature of the memory shape material.

6. The method of claim 1 wherein the surface of the structure forms a hole in the structure.

7. The method of claim 1 wherein the structure is an aircraft.

8. The method of claim 1 wherein a notch is disposed between the inner surface and the outer surface of the bearing.

9. The method of claim 1 wherein the inner surface and the outer surface of the bearing sleeve each comprise a flange.

10. The method of claim 1 wherein during the compressing and the expanding only ends of the bearing sleeve compress and expand and a middle of the bearing sleeve does not compress and expand.

11. The method of claim 1 wherein the inner surface of the bearing sleeve is linear in the inner surface compressed state and non-linear in the inner surface expanded state.

12. The method of claim 1 wherein the outer surface of the bearing sleeve is linear in the outer surface compressed state and non-linear in the outer surface expanded state.

13. The method of claim 1 wherein the expanding comprises using a warming device to reach an austenitic finish temperature of the memory shape material.

14. The method of claim 1 wherein the compressing step comprises compressing, at a martensitic finish temperature of the memory shape material, the memory shape material into the first shape, and the expanding step comprises expanding, at an austenitic finish temperature of the memory shape material, the memory shape material into the second shape.

15. The method of claim 1 wherein the compressing comprises the inner surface and the outer surface moving towards one another.

16. The method of claim 1 wherein the expanding comprises the inner surface and the outer surface moving away from one another.

17. A method for installing a bearing comprising:
    providing a bearing sleeve comprising a memory shape material having inner and outer flanges at opposite ends;
    compressing the memory shape material, at least one first temperature, into a first shape in which the inner flanges of the bearing sleeve compress from an inner flange expanded state to an inner flange compressed state, and the outer flanges of the bearing sleeve compress from an outer flange expanded state to an outer flange compressed state;
    disposing a bearing into a cavity of the bearing sleeve between the opposed inner flanges while the inner flanges are in the inner flange compressed state;
    disposing the opposed outer flanges of the bearing sleeve adjacent to a surface of a structure while the outer flanges of the bearing sleeve are in the outer flange compressed state; and
    expanding the memory shape material into a second shape, at least one second temperature, in which the inner flanges of the bearing sleeve expand from the inner flange compressed state to the inner flange expanded state to lock the bearing disposed in the cavity of the bearing sleeve between the opposed inner flanges with the bearing configured to rotate relative to the bearing sleeve, and the outer flanges of the bearing sleeve expand from the outer flange compressed state to the outer flange expanded state against the surface of the structure to lock the bearing sleeve against the surface of the structure.

18. The method of claim 17 wherein the at least one first temperature and the at least one second temperature are different.

19. The method of claim 17 wherein the compressing comprises using at least one of an immersion liquid, liquid nitrogen, a cooling material, a cooling solid, a cooling surface, or a cooling gas flow to reach the at least one first temperature.

20. The method of claim 17 wherein the expanding comprises using a warming device to reach the at least one second temperature.

21. The method of claim 17 wherein the surface of the structure forms a hole in the structure.

22. The method of claim 17 wherein a notch is disposed between the inner and the outer flanges at each of the opposite ends of the bearing sleeve.

23. The method of claim 17 wherein the inner flanges of the bearing sleeve are linear in the inner flange compressed state and non-linear in the inner flange expanded state, and the outer flanges of the bearing sleeve are linear in the outer flange compressed state and non-linear in the outer flange expanded state.

24. The method of claim 17 wherein the compressing comprises the inner flanges and the outer flanges moving towards one another.

25. The method of claim 17 wherein the expanding comprises the inner flanges and the outer flanges moving away from one another.

* * * * *